(12) United States Patent
Ballinger et al.

(10) Patent No.: US 10,479,532 B2
(45) Date of Patent: Nov. 19, 2019

(54) STRESS RELIEVED WELDS IN POSITIVE EXPULSION FUEL TANKS WITH ROLLING METAL DIAPHRAGMS

(71) Applicant: Keystone Engineering Company, Long Beach, CA (US)

(72) Inventors: Ian Ballinger, Anaheim Hills, CA (US); Wayne H. Tuttle, Torrance, CA (US)

(73) Assignee: Keystone Engineering Company, Long Beach, CA (US)

( * ) Notice: Subject to any disclaimer, the term of this patent is extended or adjusted under 35 U.S.C. 154(b) by 572 days.

(21) Appl. No.: 14/706,181

(22) Filed: May 7, 2015

(65) Prior Publication Data

US 2016/0325620 A1 Nov. 10, 2016

(51) Int. Cl.
| | | |
|---|---|---|
| *B60K 15/04* | (2006.01) | |
| *B64G 1/40* | (2006.01) | |
| *C22C 14/00* | (2006.01) | |
| *C22F 1/18* | (2006.01) | |
| *C21D 1/30* | (2006.01) | |

(Continued)

(52) U.S. Cl.
CPC ............. *B64G 1/402* (2013.01); *B23K 9/028* (2013.01); *B23K 9/23* (2013.01); *B23K 10/02* (2013.01); *B23K 15/0053* (2013.01); *B23K 15/0093* (2013.01); *B23K 26/28* (2013.01); *B23K 26/32* (2013.01); *C21D 1/30* (2013.01); *C21D 1/42* (2013.01); *C21D 9/50* (2013.01); *C22C 14/00* (2013.01); *C22F 1/183* (2013.01); *B23K 2103/14* (2018.08); *B60K 2015/0321* (2013.01);

(Continued)

(58) Field of Classification Search
CPC .......... B60K 15/04; C22F 1/183; C21D 1/30; C21D 9/50; C21D 1/42; B23K 9/028; B23K 15/0053; B23K 10/02; B23K 26/28; B23K 26/32; B23K 15/0093; B64G 1/402

USPC ............... 137/154; 244/172.2, 172.3, 118.6; 148/516; 219/121.63, 121.64

See application file for complete search history.

(56) References Cited

U.S. PATENT DOCUMENTS 3,097,292 A * 7/1963 Miklossy ................. H05H 1/34
219/121.48
3,202,160 A * 8/1965 Barger .................... B64G 1/402
137/1

(Continued)

OTHER PUBLICATIONS

Walter Tam, Mike Hersh, and Ian Ballinger, "Hybrid Porpellant Tanks for Spacecraft and Launch Vehicles", 39th AIAA Propulsion Conference, Jul. 21, 2003.

*Primary Examiner* — Jimmy Chou
(74) *Attorney, Agent, or Firm* — Kinney & Lange, P.A.

(57) ABSTRACT

A metallic positive expulsion fuel tank with stress free weld seams may include a first hemispherical shell with a first edge; and a hemispherical rolling metal diaphragm with a first edge attached to the first hemispherical shell along matching first edges. A second hemispherical shell with a first edge may be attached to the first edge of the first hemispherical shell by a first weld seam thereby forming two interior chambers separated by the hemispherical rolling metal diaphragm. A pressurized gas inlet may be attached to the first hemispherical dome; and a fuel outlet fixture may be attached to the second hemispherical dome. The first weld seam may have been stress relieved by a localized post-weld heat treatment confined to an immediate vicinity of the first weld seam.

19 Claims, 5 Drawing Sheets

(51) Int. Cl.
*C21D 9/50* (2006.01)
*C21D 1/42* (2006.01)
*B23K 9/028* (2006.01)
*B23K 15/00* (2006.01)
*B23K 10/02* (2006.01)
*B23K 26/28* (2014.01)
*B23K 26/32* (2014.01)
*B23K 9/23* (2006.01)
*B60K 15/03* (2006.01)
*B23K 103/14* (2006.01)

(52) U.S. Cl.
CPC .............. *B60K 2015/03059* (2013.01); *B60K 2015/03486* (2013.01)

(56) References Cited

U.S. PATENT DOCUMENTS

| | | | | |
|---|---|---|---|---|
| 3,584,175 A * | 6/1971 | Cardot | ............... | C22B 4/00 219/648 |
| 4,091,952 A * | 5/1978 | Capdevielle | ............... | B65D 88/62 220/530 |
| 4,538,749 A * | 9/1985 | Rosman | ............... | F02K 9/605 222/386.5 |
| 4,715,399 A * | 12/1987 | Jaekle, Jr. | ............... | B64G 1/402 137/209 |
| 4,743,278 A * | 5/1988 | Yeh | ............... | B64G 1/402 137/154 |
| 4,898,030 A * | 2/1990 | Yeh | ............... | B64G 1/402 244/135 R |
| 4,901,762 A * | 2/1990 | Miller, Jr. | ............... | B64G 1/402 137/574 |
| 4,976,398 A * | 12/1990 | Bruhn | ............... | B64G 1/402 137/38 |
| 5,279,323 A * | 1/1994 | Grove | ............... | F17C 9/00 137/154 |
| 5,407,092 A * | 4/1995 | Hardgrove | ............... | F02K 9/50 220/590 |
| 5,441,219 A * | 8/1995 | Rauscher, Jr. | ............... | B29C 53/822 220/562 |
| 5,697,511 A * | 12/1997 | Bampton | ............... | B23K 20/1265 220/4.12 |
| 5,901,557 A * | 5/1999 | Grayson | ............... | F17C 1/00 62/45.1 |
| 5,914,055 A * | 6/1999 | Roberts | ............... | B23K 9/044 219/137 WM |
| 5,916,469 A * | 6/1999 | Scoles | ............... | B29C 65/5057 219/603 |
| 6,204,476 B1 * | 3/2001 | Reynolds | ............... | B23K 9/091 219/130.51 |
| 6,531,005 B1 * | 3/2003 | Bezerra | ............... | B23P 6/002 148/516 |
| 6,745,983 B2 * | 6/2004 | Taylor | ............... | F02K 9/60 220/560.11 |
| 7,432,470 B2 * | 10/2008 | Kumar | ............... | H05H 1/24 219/121.43 |
| 7,621,291 B2 * | 11/2009 | Behruzi | ............... | B64G 1/402 137/154 |
| 8,079,126 B2 * | 12/2011 | Bampton | ............... | B23K 20/1225 220/562 |
| 8,499,983 B2 * | 8/2013 | Conrardy | ............... | F02K 9/50 222/386.5 |
| 8,511,504 B2 * | 8/2013 | Tuttle | ............... | B64G 1/402 137/154 |
| 8,534,489 B2 * | 9/2013 | Tuttle | ............... | F02K 9/605 137/154 |
| 8,596,038 B2 * | 12/2013 | Yamamoto | ............... | B64G 1/402 60/250 |
| 2001/0047988 A1 * | 12/2001 | Hiraoka | ............... | B23K 9/0213 219/137 PS |
| 2005/0137071 A1 * | 6/2005 | Cormier | ............... | G03G 15/751 492/56 |
| 2006/0011592 A1 * | 1/2006 | Wang | ............... | B23K 26/032 219/121.64 |
| 2006/0129240 A1 * | 6/2006 | Lessar | ............... | A61F 2/4425 623/17.14 |
| 2006/0283705 A1 * | 12/2006 | Tanase | ............... | B23K 15/0093 204/298.12 |
| 2007/0084509 A1 * | 4/2007 | Behruzi | ............... | F17C 3/12 137/154 |
| 2007/0145194 A1 * | 6/2007 | Behruzi | ............... | B64G 1/402 244/172.2 |
| 2010/0001133 A1 * | 1/2010 | Kempa | ............... | B23K 9/173 244/118.6 |
| 2016/0325620 A1 * | 11/2016 | Ballinger | ............... | C22C 14/00 |

* cited by examiner

STRESS RELIEVED WELDS IN POSITIVE EXPULSION FUEL TANKS WITH ROLLING METAL DIAPHRAGMS

BACKGROUND

This invention relates to the post-weld heat treatment of thin wall metal structures. In particular the invention relates to a method of locally heat treating a weld seam without thermally affecting material adjacent to the weld.

The shells of typical positive expulsion propellant fuel tanks for spacecraft that incorporate rolling diaphragms are fabricated by welding metal domes or domes and cylinders together. Additionally, the diaphragm and its supporting structure is typically welded into the tank shell components prior to final shell assembly. Of the many important design criteria associated with a spacecraft, an overriding design driver is the need for low mass. The need for reduced mass drives the material choices and the wall thickness of the tank design. In the area of the welds that hold the domes and/or cylinders together, the wall thickness is often greater than the rest of the tank wall because of the reduced strength and toughness available in the welds and the adjacent heat affected zone. Much of the available tensile strength can be restored through the use of post-weld heat treatment (PWHT) for recovery of ductility and/or stress relief.

While the PWHT of the tank shell can be readily accomplished using industry practices such as vacuum heat treatment and retort heat treatment with the part sealed in a container of inert gas, many tanks utilize metallic rolling diaphragms to separate the propellants from pressurants to enable positive expulsion of propellants in microgravity. The fragile diaphragm materials may be damaged by exposure to the high temperatures required for thermal stress relief during PWHT, which prevents the use of conventional furnaces to raise the temperature of the entire tank to the stress relief temperatures. Without stress relief the reduced material properties and residual tensile stresses remain in the weld areas of the tank shell. As a result, the tank must be made thicker to provide sufficient safety margin. The increased thickness and resultant increased mass is detrimental to the utility of the tank.

SUMMARY

A metallic positive expulsion fuel tank with stress relieved weld seams may include a first hemispherical dome with a first edge; and a metallic cylinder with first and second edges attached to the first hemispherical dome along matching first edges by a first weld seam. The tank may also include a hemispherical rolling metal diaphragm with a first edge attached to the first hemispherical dome along matching first edges; as well as a second hemispherical dome with a first edge attached to the second edge of the metallic cylinder along matching edges by a second weld seam thereby forming two interior chambers separated by a hemispherical rolling metal diaphragm. A pressurized gas inlet may be attached to the first hemispherical dome; and a fuel outlet fixture may be attached to the second hemispherical dome. The first and second weld seams may have been subjected to a localized post-weld stress relief heat treatment in which heating of the tank is confined to a distance of 2 inches (5.08 cm) of the first weld seam and a distance of 2 inches (5.08 cm) of the second weld seam such that stresses in the first and second weld seams are relieved and that the rolling metal diaphragm is unaffected by the heat treatment.

A method of forming a metallic positive expulsion fuel tank may include forming a first hemispherical dome with a first edge; and a metallic cylinder with first and second edges; and welding the metallic cylinder to the first hemispherical dome along the first edge of the first hemispherical dome and the first edge of the metallic cylinder to form a first weld seam. The method may also include forming a hemispherical rolling metal diaphragm with a first edge; and attaching the hemispherical rolling metal diaphragm to the cylinder along the first edge of the diaphragm and the second edge of the cylinder; as well as forming a second hemispherical dome with a first edge. The second hemispherical dome is welded to the cylinder along the first edge of the second hemispherical dome and the second edge of the cylinder to form a second weld seam and a container with two interior chambers separated by a hemispherical rolling metal diaphragm boundary. Additional steps include attaching a pressurized gas inlet fixture to the first hemispherical dome; and attaching a fuel outlet fixture to the second hemispherical dome to form the positive expulsion fuel tank. In a final step, a localized post-weld stress relief heat treatment is performed on the first and second weld seams during which heating of the tank is confined to a distance of 2 inches (5.08 cm) of the first weld seam and a distance of 2 inches (5.08 cm) of the second weld seam such that stresses in the first and second weld seams are relieved and the rolling metal diaphragm is unaffected by the heat treatment.

DETAILED DESCRIPTION

An accepted method to provide fuel to spacecraft engines in gravity free environments is by positive expulsion propellant fuel tanks. These tanks are simple structures consisting of domes or domes and cylinders welded together to form a tank shell. A flexible diaphragm is positioned inside the tank to form two chambers separated by the diaphragm. One chamber contains fuel and the other chamber contains compressed gas. Increased pressure in the gas filled chamber forces fuel out of the fuel chamber through a fuel supply fitting to an engine during operation of the system.

In prior art practice, weld seams in completed spacecraft fuel tanks can only be heat treated by subjecting the entire tank to a heat treat schedule wherein the high temperatures may degrade the mechanical properties of sensitive propulsion management devices and other structures already in place in the welded tank structure. The ability to perform post-weld heat treatments in a welded structure wherein the heat treat temperatures are confined to the immediate vicinity of the welds can alleviate many of the problems associated with overheating.

Figure 1:
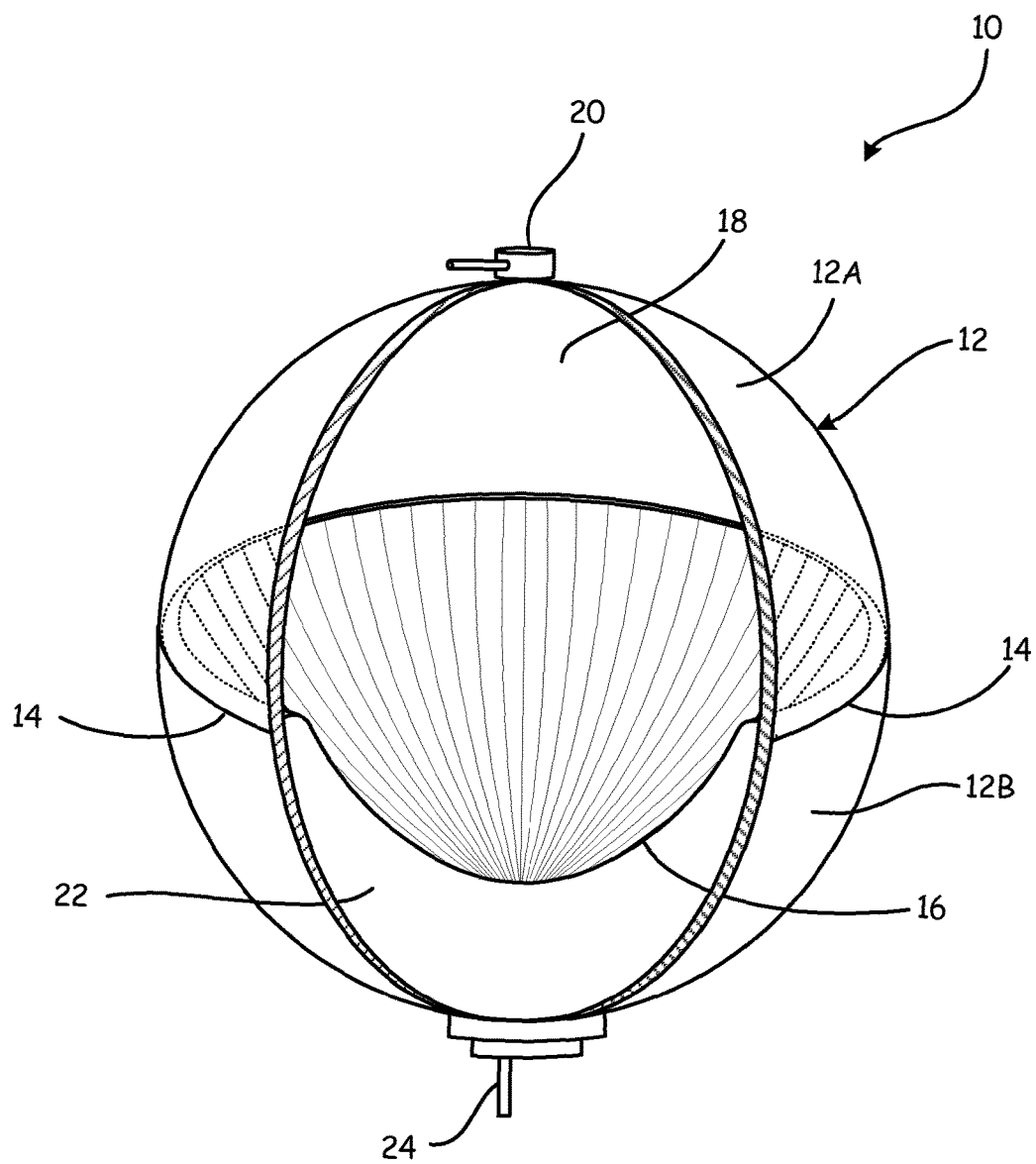
FIG. 1 is a schematic partial cut-away view of a positive expulsion fuel tank.

FIG. 1 is a schematic illustration showing a partial cutaway view of a positive expulsion fuel tank with a rolling metal diaphragm therein. In the embodiment shown in FIG.

1, positive expulsion fuel tank 10 may comprise tank shell 12 made up of hemispherical metal shells 12A and 12B joined along weld seam 14. Rolling metal diaphragm 16 may be attached to the inner wall of tank 10 in the vicinity of weld seam 14. Rolling metal diaphragm 16 may separate tank 10 into two chambers. Chamber 18 may contain pressurized gas that enters chamber 18 through gas fitting 20. Fuel chamber 22 may contain propellant that is directed to an engine (not shown) through fuel fitting 24.

Metal shell 12 of fuel tank 10 may be a titanium alloy, an aluminum alloy, a corrosion resistant steel, a nickel alloy, or others known in the art. A preferred tank material for some embodiments is a titanium alloy. Thickness of tank shell 12 depends on the material and may be from about 20 mils (508 microns) to about 125 mils (3175 microns) in typical embodiments.

Rolling metal diaphragm 16 may be a thin flexible membrane that may be an aluminum alloy, a corrosion resistant steel, a titanium alloys, a nickel alloy, or others known in the art. The thickness of rolling metal diaphragm 16 depends on the material and may be from about 15 mils (381 microns) to about 50 mils (1270 microns) in typical embodiments.

Figure 2:
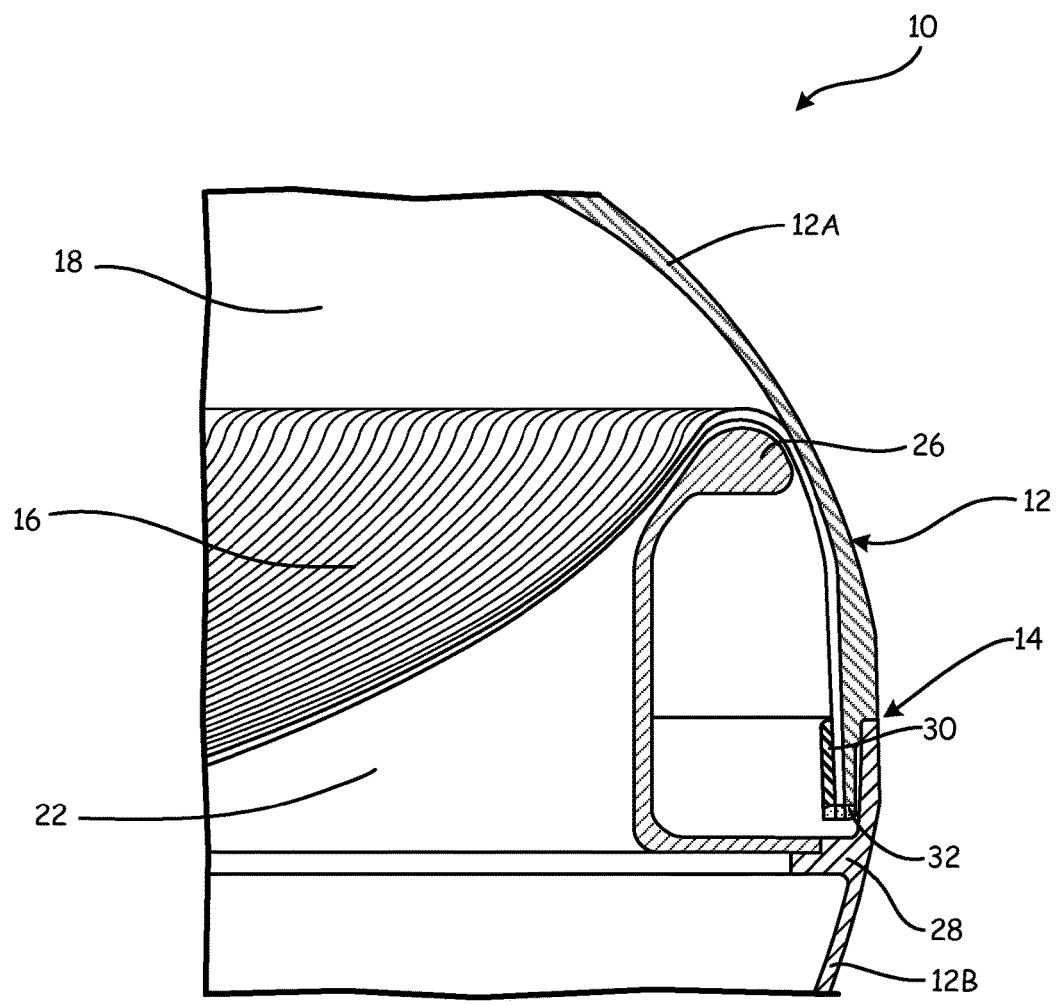
FIG. 2 is a schematic illustration of a cross-section of the positive expulsion fuel tank of FIG. 1 in the vicinity of the weld seam.

FIG. 2 is a schematic illustration of a cross-section of positive expulsion fuel tank 10 in the vicinity of weld seam 14 showing an example attachment detail of rolling metal diaphragm 16 to tank shell 12. In the embodiment shown in FIG. 2, rolling metal diaphragm 16 may be supported in the interior of positive expulsion fuel tank 10 by ring support 26. Ring support 26 may be supported on shelf 28 formed on the interior diameter of hemispherical shell 12B. The purpose of ring support 26 is to prevent any sharp bends from forming in rolling metal diaphragm 16 as fuel in chamber 22 is added and withdrawn during mission cycles. Rolling metal diaphragm 16 may be attached to upper hemispheric shell 12A by ring 30 and weld 32. During assembly of positive expulsion fuel tank 10, rolling metal diaphragm 16 may be first attached to upper hemispherical shell 12A by ring 30 and weld 32. Upper hemispherical shell 12A and attached rolling metal diaphragm 16 may then be fitted over ring support 26 in order to join hemispherical shell 12A containing attached rolling metal diaphragm 16 to lower hemispherical shell 12B along seam 14. As a final assembly step, seam 14 may be welded to form completed positive expulsion fuel tank 10.

Figure 3:
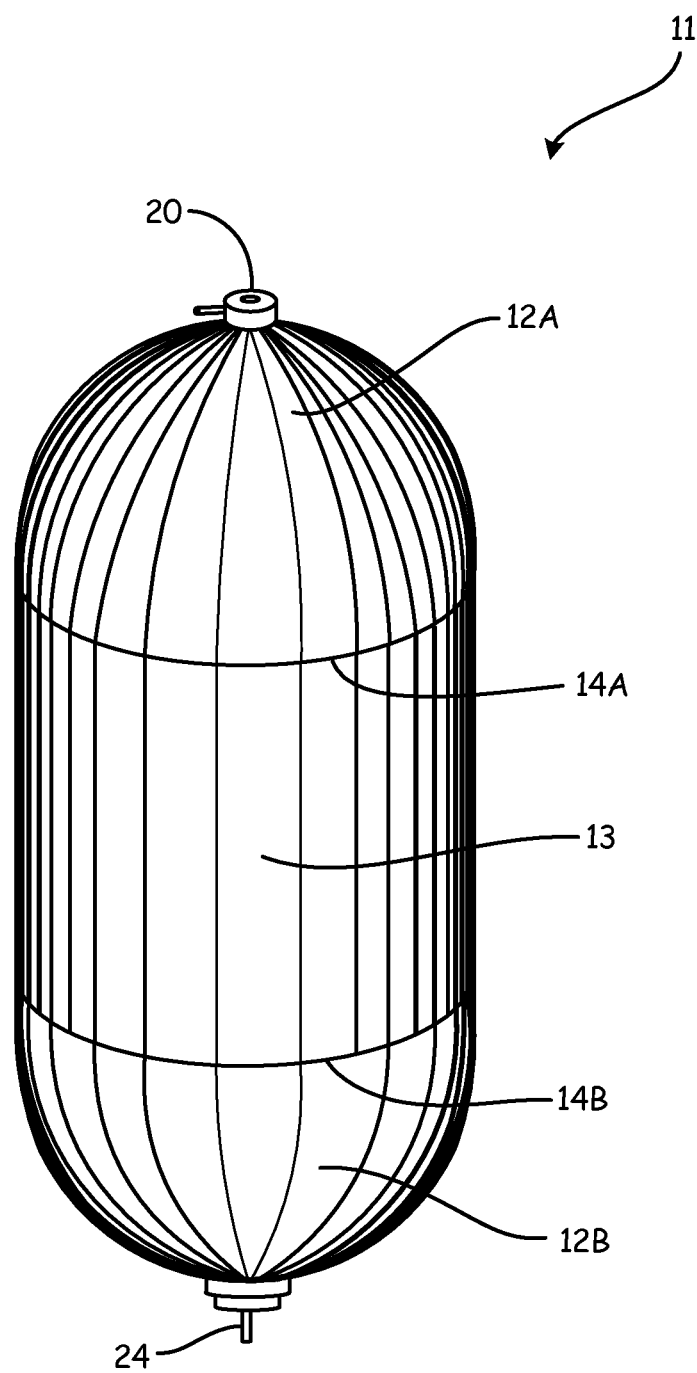
FIG. 3 is a schematic illustration of a fuel tank with hemispherical ends and a cylindrical center section.

In an embodiment of the invention, a metal positive expulsion fuel tank may have an elongated shape provided by a cylindrical center section of the tank. A schematic illustration of elongated positive expulsion fuel tank 11 is shown in FIG. 3. Positive expulsion fuel tank 11 comprises hemispherical shells 12A and 12B joined to center cylindrical section 13 along weld seams 14A and 14B. In an embodiment, a rolling metal diaphragm (not shown) may be joined to an interior of positive expulsion fuel tank 11 along weld seam 14A or weld seam 14B depending on mission requirements. The rolling metal diaphragm may separate the interior of tank 11 into two chambers separated by the rolling metal diaphragm wherein one chamber contains pressurized gas and the other fuel. Pressurized gas may enter tank 11 through gas fitting 20 and, as noted above, may force fuel in the other chamber to exit tank 11 through fuel fitting 24 to an engine (not shown).

As noted above, in the welded condition, welds 14, 14A and 14B may contain at least internal stresses that need to be relieved by a post-weld heat treatment (PWHT). In addition, for many alloys, a PWHT may be required to restore lost tempers by, for instance, a solution heat treatment followed by quench and aging heat treatments. This may be accomplished by a PWHT method and PWHT apparatus described in co-pending patent application Ser. No. 14/287,975 which is hereby incorporated by reference in its entirety.

The PWHT apparatus may include an enclosure covering a weld seam that contains an inert flowing gas, water cooled cooling bands mounted on each side of the weld seam, a thermal insulating blanket covering the weld seam, and an induction coil or coils in close proximity to the weld seam to locally heat the weld seam. A schematic cross section of such a PWHT apparatus 40 is shown in FIG. 3. PWHT apparatus 40 is shown positioned on external surface 12 of welded thin wall positive expulsion fuel tank 10 surrounding weld seam 14.

Apparatus 40 may further comprise induction coil 46 proximate weld seam 14. Induction coil 46 may comprise multiple induction coils as needed. Induction coil 46 may be energized by induction power supply and control system 48, as shown schematically by dotted line 50. Apparatus 40 may further comprise cooling bands 52, thermal insulating blanket 54, and thermocouple 58. Cooling bands 52 may be fluid cooled, thermoelectrically cooled, or cooled by other means known in the art. An exemplary cooling medium is water. Cooling bands 52 may be attached to positive expulsion fuel tank 10 with thermally conductive adhesive 55 to ensure maximum thermal conductivity between cooling bands 52 and positive expulsion fuel tank 10 to prevent regions of positive expulsion fuel tank 10 external to cooling bands 52 from overheating.

Thermocouple 58 supplies temperature data to induction power supply and control system 48 as schematically indicated by dotted line 60. In some embodiments, thermocouple 58 may be replaced with an infrared pyrometer, thermistor or other temperature sensing devices known in the art. Weld seam 14, cooling bands 52, thermal insulating blanket 54, and thermocouple 58 may be covered with inert atmosphere enclosure 62. Inert atmosphere enclosure 62 may include inlet port 66 attached to a source of inert gas schematically indicated by arrow 68 and exhaust port 70 containing exhaust gas schematically indicated by arrow 72. Inert atmosphere enclosure 62 may be an electrically non-conducting material enclosure that is transparent to an inductive field. Suitable non-conducting materials for inert atmosphere enclosure 62 may include flexible heat resistant materials such as silicone or rigid composites.

Inert gas 68 may be argon, nitrogen, helium, or others known in the art. Exhaust gas 72 may be passed through oxygen analyzer 73 to determine oxygen levels of the inert atmosphere leaving inert atmosphere enclosure 62. Oxygen levels of less than 50 ppm are preferred to prevent oxidation during the post-weld heat treatment process.

External surface 74 of weld seam 14 and adjacent regions may be under an inert atmosphere during a post-weld heat treatment. Interior 76 of positive expulsion fuel tank 10 may be filled with inert gas to prevent oxidation during the PWHT process.

Figure 5:
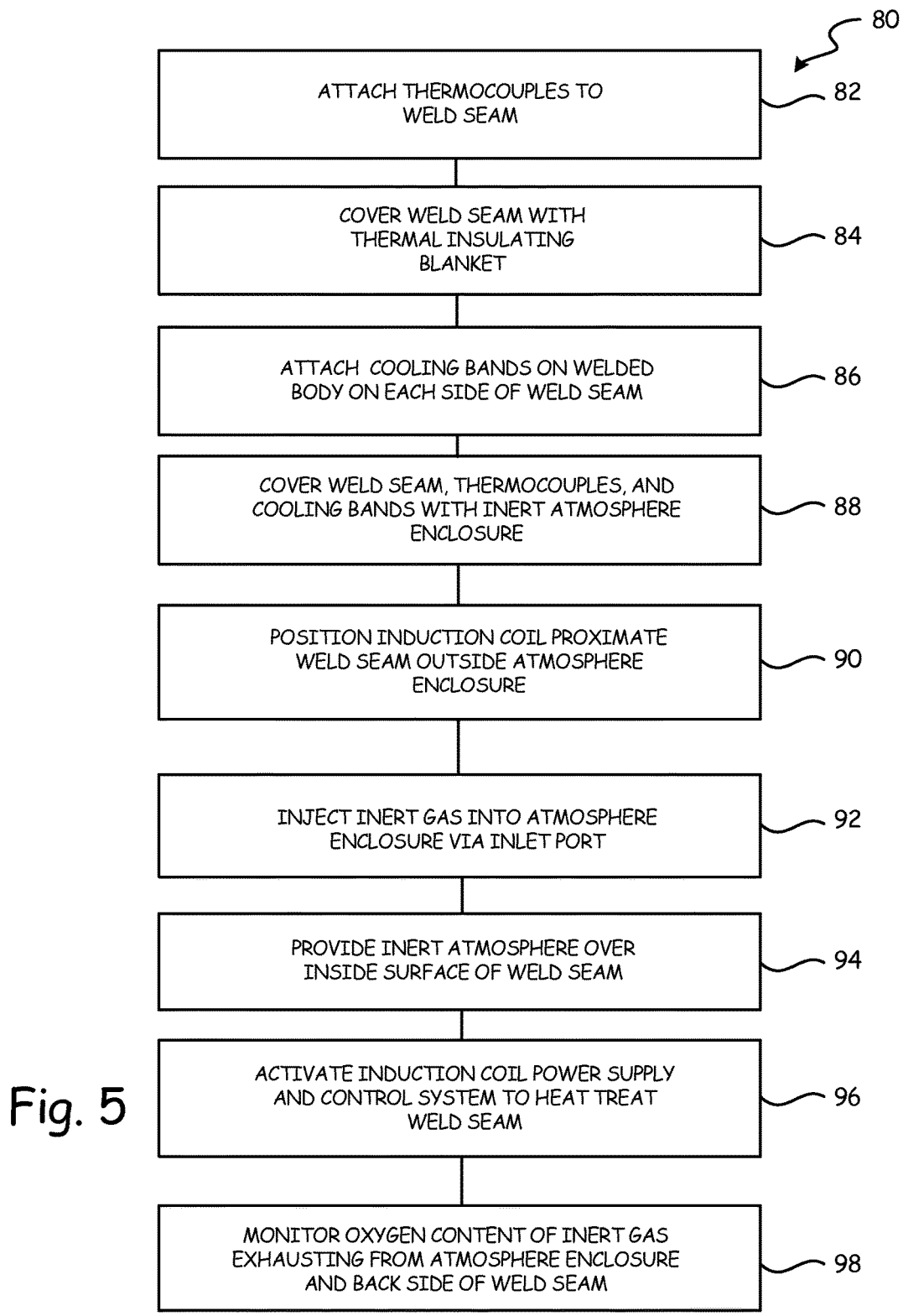
FIG. 5 is a diagram of a post-weld heat treatment process.

FIG. 5 is a flow diagram illustrating post-weld heat treatment method 80 according to an embodiment of the present invention. In the first step, thermocouple 58 may be attached to weld seam 14 to indicate temperature during heat treatment (step 82). Weld seam 14 may then be covered with thermal insulating blanket 54 (step 84). Blanket 54 may be fabricated from any material with appropriate physical characteristics coupled with thermal and electrical insulating properties. Preferred insulating materials include woven fiberglass cloth or woven ceramic or refractory fiber cloth.

In the next step, cooling bands 52 may be attached to positive expulsion fuel tank 10 on each side of weld seam 14

Figure 4:
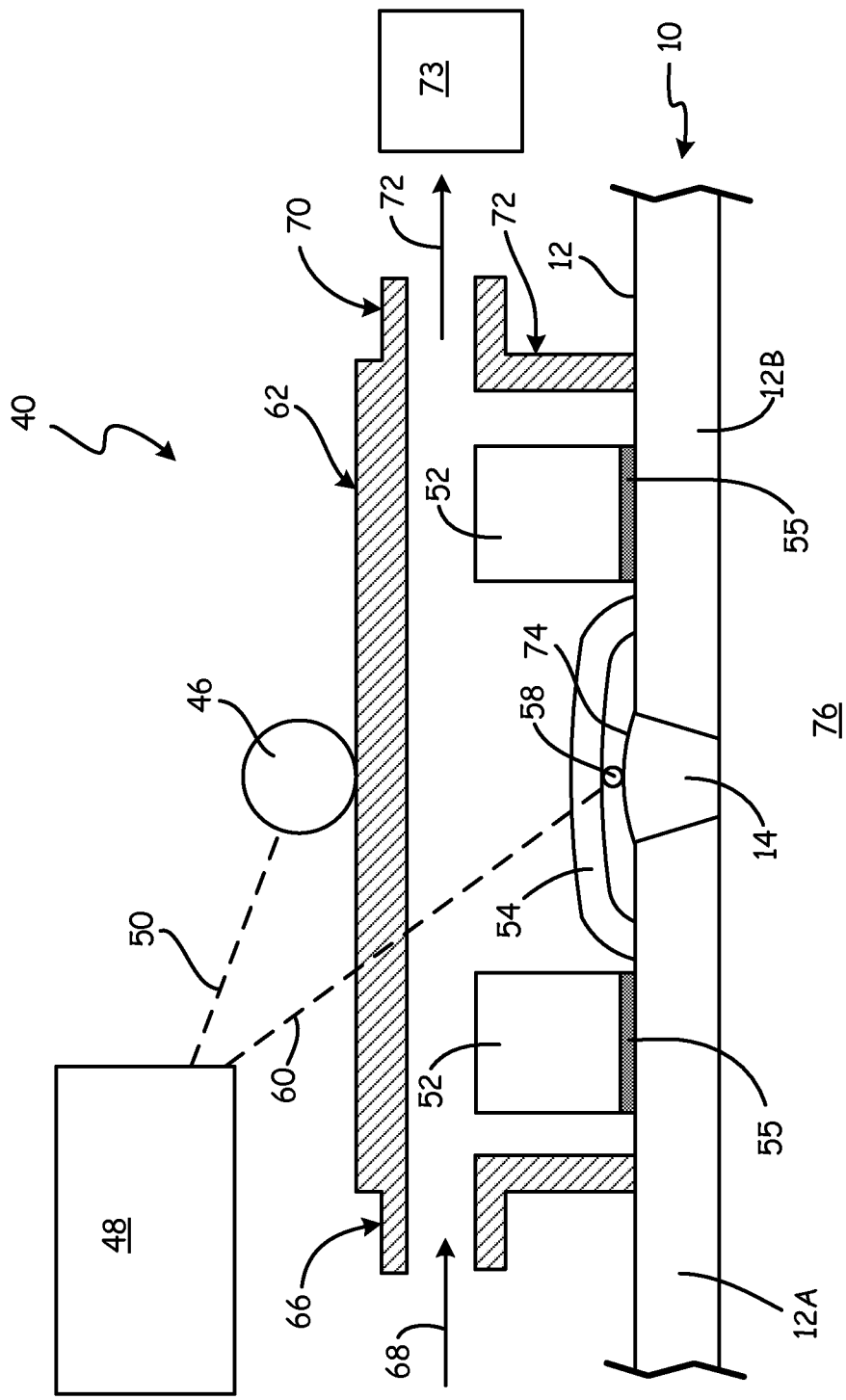
FIG. 4 is a schematic representation of a post-weld heat treatment apparatus.

(step 86). Preferably, cooling bands 52 are placed about 2 inches (5.08 cm) from the weld seams. Cooling bands 52 are shaped to closely follow the contour of the external surface of tank shell 12 of positive expulsion fuel tank 10. In an embodiment, interfaces 55 between cooling bands 52 and positive expulsion fuel tank 10 may be filled with a thermally conducting adhesive material to ensure maximum thermal conductivity between cooling bands 52 and external surface 12 of positive expulsion fuel tank 10 as shown in FIG. 4. Examples of thermally conducting adhesive material forms include tapes, greases, pastes, and sheets.

In the next step, weld seam 14, thermocouples 58, and cooling bands 52 may be covered with inert atmosphere enclosure 62 (step 88). Inert atmosphere enclosure 62 may contain inlet port 66 connected to an inert gas source as indicated by arrow 68. Inert atmosphere enclosure 62 may also include exhaust port 70 wherein the exhaust gases, indicated by arrow 72, may be analyzed by oxygen analyzer 73. As noted earlier, inert atmosphere enclosure 62 may be composed of an electrical non-conductor such that it is transparent to the induction field from induction coil 46.

Induction coil 46 (or multiple induction coils) may then be positioned proximate weld seam 14 outside inert atmosphere enclosure 62 (step 90). The induction system may include power supply and control system 48 connected to thermocouple 58 on weld seam 14 to provide a controllable time-temperature profile during the heat treatment. In some embodiments a larger enclosure may place the induction coil or coils within the inert atmosphere.

In the next step, inert gas may be inserted into inert atmosphere enclosure 62 at arrow 68 (step 92). At this point, the internal surface of positive expulsion fuel tank 10 may also be protected by an inert atmosphere. A preferred oxygen level surrounding weld seam 14 is less than 50 ppm to prevent oxidation. Tank interior 76 may also be filled with flowing inert gas (step 94).

Power supply and control system 48 may then be activated to perform a post-weld heat treatment of weld seam 12 (step 96). During the post-weld heat treatment, the oxygen content of inert gas exiting inert atmosphere enclosure 62 at arrow 72 and the tank interior may be monitored by oxygen analyzer 73 to ensure the absence of oxidation during the heat treatment process (step 98).

A benefit of apparatus 40 is that weldments in thin wall metallic structures may be subjected to heat treatment profiles at temperatures exceeding 2000° F. (1098° C.) on site during which the heat affected zone is restricted to the immediate vicinity of the weld seam. As a result, the microstructure and properties of material directly adjacent to the weld seam are unaffected. In addition, the low thermal mass of the method allows rapid cool down following solution treatment, limiting unwanted precipitation and grain growth in the thin wall structure. Expensive and elaborate furnaces, retorts, and other equipment associated with heat treatment of complete structures are unnecessary.

In some embodiments, positive expulsion fuel tanks may be titanium or titanium alloys. Non-limiting examples may include CPTi, Ti-6Al-4V, and Ti-2.5V-4Al-1.5Fe (Ti38). Welds in these materials may be given a PWHT at about 1025° F. (552° C.) for about 3 hours.

Discussion of Possible Embodiments

The following are non-exclusive descriptions of possible embodiments of the present invention.

A metallic positive expulsion fuel tank may include: a first hemispherical shell with a circumferential edge; a hemispherical rolling metal diaphragm with a circumferential edge attached to the circumferential edge of the first hemispherical shell; a second hemispherical shell with a circumferential edge attached to the circumferential edge of the first hemispherical shell by a first weld seam forming two interior chambers separated by the hemispherical rolling metal diaphragm, the first weld seam being stress relieved by localized post-weld heat treatment confined to an immediate vicinity of the first weld seam; a pressurized propellant gas inlet attached to the first hemispherical shell and a fuel outlet fixture attached to the second hemispherical shell.

The fuel tank of the preceding paragraph can optionally include, additionally and/or alternatively any, one or more of the following features, configurations and/or additional components:

The first and second hemispherical shells may be constructed from a titanium alloy, an aluminum alloy, a corrosion resistant steel, or a nickel alloy.

The first and second hemispherical shells may be CPTi, Ti-6Al4V, or Ti-2.5V-4Al-1.5Fe (Ti38).

The hemispherical rolling metal diaphragm material may be an aluminum alloy, a corrosion resistant steel, titanium alloy, or a nickel alloy.

The first weld seam may be stress relieved by a localized post-weld heat treatment of about 1025° F. (552° C.) for about 3 hours.

The thickness of the first and second hemispherical shells may be from about 20 mils (508 microns) to about 125 mils (3175 microns).

The first weld seam may be a gas tungsten arc weld, plasma arc weld, laser beam weld, or electron beam weld.

The fuel tank may be a spacecraft engine fuel tank.

The positive expulsion fuel tank may be a metallic cylinder attached between the first and second hemispherical shells, wherein the first weld seam attaches the first edge of the first hemispherical shell to the first edge of the metallic cylinder and the second weld seam attaches the first edge of the second hemispherical shell to the second edge of the metallic cylinder.

A method of forming a metallic positive expulsion fuel tank may include: forming a first hemispherical shell with a first edge; forming a metallic cylinder with first and second edges; welding the metallic cylinder to the first hemispherical shell along the first edge of the first hemispherical shell and the first edge of the metallic cylinder to form a first weld seam; forming a hemispherical rolling metal diaphragm with a first edge; attaching the hemispherical rolling metal diaphragm to the metallic cylinder along the first edge of the diaphragm and the second edge of the metallic cylinder; forming a second hemispherical shell with a first edge; welding the second hemispherical shell to the cylinder along the first edge of the second hemispherical shell and the second edge of the metallic cylinder to form a second weld seam and a container with two interior chambers separated by the hemispherical rolling metal diaphragm; attaching a pressurized gas inlet fixture to the first hemispherical shell; attaching a fuel outlet fixture to the second hemispherical shell; and performing a localized post-weld heat stress-relief heat treatment on the first and second weld seams in which heating of the tank is confined to a distance of 2 inches (5.08 cm) from the first weld seam and a distance of 2 inches (5.08 cm) from the second weld seam such that stresses in first and second weld seams are relieved and the rolling metal diaphragm is unaffected by the heat treatment.

The method of the preceding paragraph can optionally include, additional and/or alternatively any one or more of the following features, configurations and/or additional components:

The ends and wall of the metallic fuel tank may be constructed from a titanium alloy, an aluminum alloy, a corrosion resistant steel, or a nickel alloy.

The ends and wall of the tank may be constructed of CPTi, Ti-6Al-4V, or Ti-2.5V-4Al-1.5Fe (Ti38).

The rolling metal diaphragm may be composed of an aluminum alloy, a corrosion resistant steel, a titanium alloy, or a nickel alloy.

The thickness of the ends and wall of the tank may be from about 20 mils (508 microns) to about 125 mils (3175 microns).

The post-weld heat treatment may be a temperature of about 1025° F. (552° C.) for about 3 hours.

Performing the localized post-weld heat treatment on the first and second weld seams may include covering the external surface of the first and second weld seams with first and second insulating blankets; attaching at least two cooling bands to the external surface of the fuel tank with at least one cooling band attached on each side of the first and second weld seams; surrounding the first and second weld seams, first and second insulating blankets, and cooling bands with an inert atmosphere enclosure; providing an inert atmosphere within the inert atmosphere enclosure; providing an inert atmosphere over the internal surface of the fuel tank; positioning at least one induction coil proximate the first and second weld seams and external to the inert atmosphere enclosure; activating the induction coil to subject the first and second weld seams to a heat treatment schedule while cooling regions external to the first and second weld seams with the cooling bands; and sensing temperature of the first and second weld seams with a temperature sensor and controlling power supplied to the induction coil as a function of the sensed temperature.

Welding may include gas tungsten arc, plasma arc, laser beam, or electron beam welding.

The fuel tank may be a spacecraft engine fuel tank.

The induction coil may be positioned inside the inert atmosphere enclosure.

A metallic positive expulsion fuel tank may be formed by forming a first hemispherical shell with a first edge; forming a metallic cylinder with first and second edges; welding the metallic cylinder to the first hemispherical shell along the first edge of the first hemispherical shell and the first edge of the metallic cylinder to form a first weld seam; forming a hemispherical rolling metal diaphragm with a first edge; attaching the hemispherical rolling metal diaphragm to the metallic cylinder along the first edge of the diaphragm and the second edge of the metallic cylinder; forming a second hemispherical shell with a first edge; welding the second hemispherical shell to the cylinder along the first edge of the second hemispherical shell and the second edge of the metallic cylinder to form a second weld seam with a container with two interior chambers separated by the hemispherical rolling metal diaphragm; attaching a pressurized gas inlet fixture to the first hemispherical shell; attaching a fuel outlet fixture to the second hemispherical shell; and performing a localized post-weld stress-relief heat treatment on the first and second weld seams in which heating of the tank is confined to a distance of 20 tank thicknesses from the first weld seam and a distance of 20 tank thicknesses from the second weld seam such that stresses in the first and second weld seams are relieved and the rolling metal diaphragm is unaffected by the heat treatment.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A metallic positive expulsion fuel tank comprising:
   a first hemispherical shell having a first circumferential edge;
   a hemispherical rolling metal diaphragm with a circumferential edge attached to the first circumferential edge of the first hemispherical shell;
   a second hemispherical shell having a first circumferential edge attached to the first circumferential edge of the first hemispherical shell by a first weld seam forming two interior chambers separated by the hemispherical rolling metal diaphragm, the first and second hemispherical shells each having a localized post-weld heat-treated stress-relieved region confined within a distance of 2 inches (5.08 cm) from the first weld seam;
   a pressurized gas inlet attached to the first hemispherical shell; and
   a fuel outlet fixture attached to the second hemispherical shell.

2. The metallic positive expulsion fuel tank of claim 1 wherein the first hemispherical shell and the second hemispherical shell are constructed from a titanium alloy, an aluminum alloy, a corrosion resistant steel, or nickel alloy.

3. The metallic positive expulsion fuel tank of claim 2 wherein the first hemispherical shell and the second hemispherical shell are CPTi, Ti-6Al-4V, or Ti-2.5V-4Al-1.5Fe (Ti38).

4. The metallic positive expulsion fuel tank of claim 1 wherein the hemispherical rolling metal diaphragm is composed of aluminum alloy, corrosion resistant steel, titanium alloy, or nickel alloy.

5. The metallic positive expulsion fuel tank of claim 3 wherein the first weld seam is located in the stress relieved localized post-weld heat treated region that was subjected to 1025° F. (552° C.) for 3 hours.

6. The metallic positive expulsion fuel tank of claim 1 wherein a thickness of the first hemispherical shell and the second hemispherical shell is from 20 mils (508 microns) to 125 mils (3175 microns).

7. The metallic positive expulsion fuel tank of claim 1 wherein the first weld seam comprises a gas tungsten arc weld, plasma arc weld, laser beam weld, or electron beam weld.

8. The metallic positive expulsion fuel tank of claim 1 wherein the metallic positive expulsion fuel tank comprises a spacecraft engine fuel tank.

9. The metallic positive expulsion fuel tank of claim 1 further comprising a metallic cylinder having a first circumferential edge and a second circumferential edge attached between the first hemispherical shell and the second hemispherical shell, wherein the first weld seam attaches the first circumferential edge of the first hemispherical shell to the first circumferential edge of the metallic cylinder and a second weld seam attaches the first circumferential edge of the second hemispherical shell to the second circumferential edge of the metallic cylinder.

10. A method of forming a metallic positive expulsion fuel tank, the method comprising:

forming a first hemispherical shell having a first circumferential edge;

forming a metallic cylinder having a first circumferential edge and a second circumferential edge;

welding the first circumferential edge of the metallic cylinder to the first circumferential edge of the first hemispherical shell along the first circumferential edge of the first hemispherical shell and the first circumferential edge of the metallic cylinder to form a first weld seam;

forming a hemispherical rolling metal diaphragm having a first circumferential edge;

attaching the hemispherical rolling metal diaphragm to the metallic cylinder along the first circumferential edge of the diaphragm and the second circumferential edge of the metallic cylinder;

forming a second hemispherical shell having a first circumferential edge;

welding the first circumferential edge of the second hemispherical shell to the second circumferential edge of the cylinder along the first circumferential edge of the second hemispherical shell and the second circumferential edge of the metallic cylinder to form a second weld seam and a container with two interior chambers separated by the hemispherical rolling metal diaphragm;

attaching a pressurized gas inlet fixture to the first hemispherical shell;

attaching a fuel outlet fixture to the second hemispherical shell; and performing a localized post-weld stress relief heat treatment on the first and second weld seams in which heating of the metallic positive expulsion fuel tank is confined to a distance of 2 inches (5.08 cm) from the first weld seam and a distance of 2 inches (5.08 cm) from the second weld seam such that stresses in the first and second weld seams are relieved and the rolling metal diaphragm is unaffected by the localized post-weld stress relief heat treatment.

11. The method of claim 10 wherein the ends and wall of the metallic fuel tank are constructed of a titanium alloy, an aluminum alloy, a corrosion resistant steel, or a nickel alloy.

12. The method of claim 10 wherein the ends and wall of the tank are constructed of CPTi, Ti-6Al-4V, or Ti-2.5V-4Al-1.5Fe (Ti38).

13. The method of claim 10 wherein the rolling metal diaphragm is composed of an aluminum alloy, a corrosion resistant steel, a titanium alloy, or a nickel alloy.

14. The method of claim 10 wherein a thickness of the ends and wall of the tank is from 20 mils (508 microns) to 125 mils (3175 microns).

15. The method of claim 12 wherein the localized post-weld stress relief heat treatment comprises a temperature of 1025° F. (552° C.) for 3 hours.

16. The method of claim 10 wherein performing the localized post-weld stress relief heat treatment on the first and second weld seams comprises:

covering the external surface of the first and second weld seams with first and second insulating blankets;

attaching at least two cooling bands to the external surface of the fuel tank with at least one cooling band attached on each side of the first and second weld seams;

surrounding the first and second weld seams, first and second insulating blankets, and cooling bands with an inert atmosphere enclosure;

providing an inert atmosphere within the inert atmosphere enclosure;

providing an inert atmosphere over the internal surface of the fuel tank;

positioning at least one induction coil proximate the first and second weld seams and external to the inert atmosphere enclosure;

activating the induction coil to subject the first and second weld seams to a heat treatment schedule while cooling regions external to the first and second weld seams with the cooling bands; and sensing temperature of the first and second weld seams with a temperature sensor and controlling power supplied to the induction coil as a function of the sensed temperature.

17. The method of claim 10 wherein welding comprises gas tungsten arc, plasma arc, laser beam, or electron beam welding.

18. The method of claim 10 wherein the fuel tank comprises a spacecraft engine fuel tank.

19. The method of claim 16 wherein the induction coil is positioned inside the inert atmosphere enclosure.

* * * * *